United States Patent
Yang et al.

(10) Patent No.: US 8,576,210 B2
(45) Date of Patent: Nov. 5, 2013

(54) DISPLAY APPARATUS

(75) Inventors: Hyo-Sang Yang, Yongin (KR);
Byung-Chang Shim, Yongin (KR);
Dong-Wan Choi, Yongin (KR);
Hee-Kwon Eun, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 230 days.

(21) Appl. No.: 13/233,902

(22) Filed: Sep. 15, 2011

(65) Prior Publication Data

US 2012/0113073 A1    May 10, 2012

(30) Foreign Application Priority Data

Nov. 9, 2010  (KR) .................. 10-2010-0110946

(51) Int. Cl.
*G06F 3/038*    (2013.01)

(52) U.S. Cl.
USPC .......................................... 345/205; 345/206

(58) Field of Classification Search
None
See application file for complete search history.

(56) References Cited

U.S. PATENT DOCUMENTS

| 7,460,112 B2 * | 12/2008 | Yamada .................. 345/204 |
| 7,993,730 B2 * | 8/2011 | Ayukawa ................. 428/194 |
| 2012/0206680 A1 * | 8/2012 | Onishi ..................... 349/122 |

FOREIGN PATENT DOCUMENTS

| KR | 10-2005-0064549 (A) | 6/2005 |
| KR | 10-2005-0064550 (A) | 6/2005 |

* cited by examiner

*Primary Examiner* — Jason Olson
(74) *Attorney, Agent, or Firm* — Knobbe, Martens, Olson & Bear LLP

(57) ABSTRACT

A display apparatus is disclosed. The display includes a display panel, a signal transmitter, and a driving chip. The signal transmitter is electrically connected with the display panel at a first bonding region of the display panel and receives an input signal from the outside. Further, the driving chip is electrically connected with the display panel at a second bonding region of the display panel and outputs a driving signal in response to the input signal. Further, the signal transmitter includes a base layer, a first conductive layer that is electrically connected with the display panel, and a second conductive layer that covers the first bonding region and the second bonding region. The second conductive layer can block electro static discharge and electro magnetic interference, such that it is possible to prevent display quality of the display apparatus from being deteriorated.

10 Claims, 4 Drawing Sheets

DISPLAY APPARATUS

CROSS-REFERENCE TO RELATED APPLICATION

This application claims priority to and the benefit of Korean Patent Application No. 10-2010-0110946, filed on Nov. 9, 2010, in the Korean Intellectual Property Office, the entire content of which is incorporated herein by reference.

BACKGROUND

1. Field

The present invention relates to a display apparatus, and in more detail, to a display apparatus that is resistant to poor quality caused by electro magnetic interference or electro static discharge.

2. Description of the Related Technology

Display apparatuses, display an image corresponding to data in an input signal. Therefore, a display apparatus is connected with electronic devices that output the input signal in order to receive the input signal. EMI (Electro Magnetic Interference) that can cause noises in the image is generated while the display apparatus receives the input signal, thereby reducing the display quality of the display apparatus.

Further, ESD (Electro Static Discharge) to or from the display apparatus causes the display apparatus to be broken and/or deteriorated. In particular, in a display apparatus having a driving chip having a metal thin layer, an insulation layer, and a semiconductor thin layer in high density, may suffer critical malfunction because of the ESD.

SUMMARY OF CERTAIN INVENTIVE ASPECTS

One inventive aspect is a display apparatus. The display apparatus includes a display panel configured to display an image, a signal transmitter electrically connected with the display panel at a first bonding region of the display panel and receives an input signal from a source external to the display apparatus, and a driving chip that is electrically connected with the display panel at a second bonding region of the display panel and outputs a driving signal corresponding to the image to the display panel in response to the input signal. The signal transmitter includes a base layer, a first conductive layer on the base layer, where the first conductive layer is electrically connected to the display panel, and a second conductive layer that covers the first bonding region and the second bonding region, where the base layer is between the first and second conductive layers.

BRIEF DESCRIPTION OF THE DRAWINGS

The accompanying drawings, together with the specification, illustrate exemplary embodiments, and, together with the description, serve to explain various aspects and principles.

DETAILED DESCRIPTION OF CERTAIN INVENTIVE EMBODIMENTS

Figure 1:
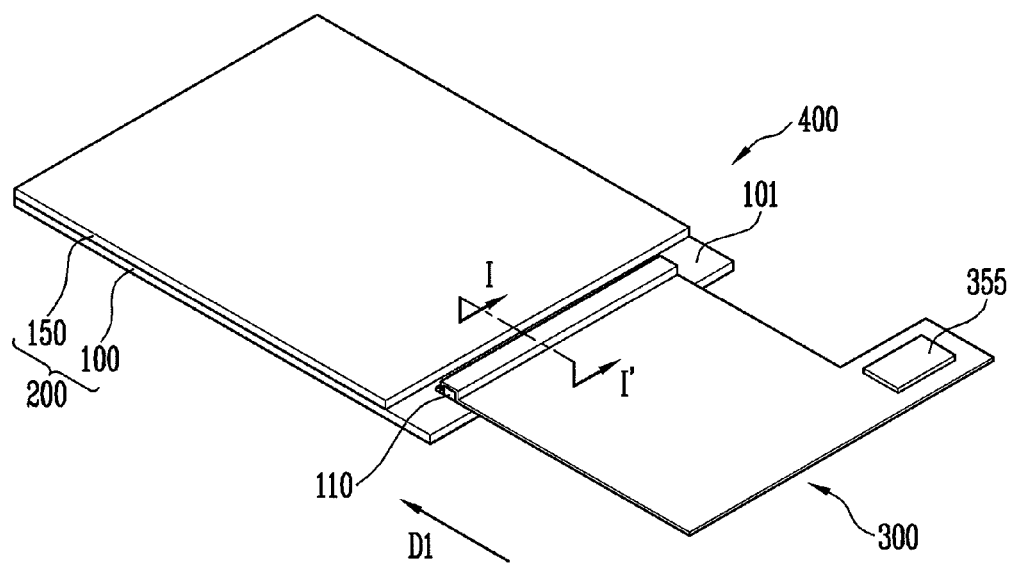
FIG. 1 is a perspective view of a display apparatus according to an embodiment.

In the following detailed description, certain exemplary embodiments have been shown and described, simply by way of illustration. As those skilled in the art would realize, the described embodiments may be modified in various ways, without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals generally refer to like elements.

Hereinafter, certain features and embodiments will be described in detail with reference to the accompanying drawings. The objects, features, and effects of the embodiments will be understood from the description relating to the accompanying drawings. However, the present invention is not limited to the embodiments described herein, which may be modified in various ways. In addition, the drawings provided in connection with the following embodiments are simplified and/or exaggerated for clear description and the same reference numerals in the drawings generally designate the same components.

Figure 2:
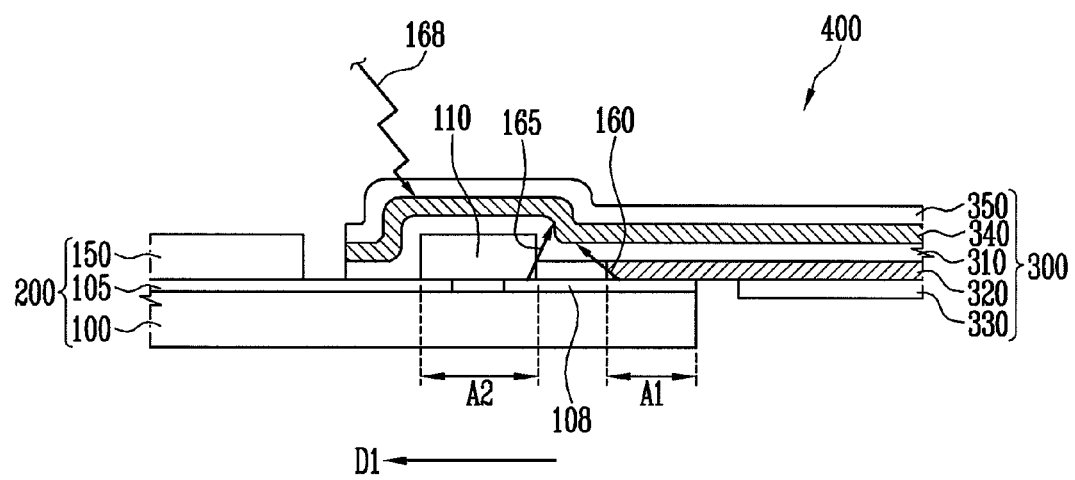
FIG. 2 is a cross-sectional view showing a portion cut off along the line I-I' of FIG. 1.

FIG. 1 is a perspective view of a display apparatus according to an embodiment of the present invention and FIG. 2 is a cross-sectional view of a portion cut off along the line I-I' of FIG. 1.

Referring to FIGS. 1 and 2, a display apparatus 400 includes a display panel 200, a signal transmitter 300, and a driving chip 110. The display panel 200 has a bonding portion 101 exposed to the outside and the bonding portion 101 is electrically connected with the signal transmitter 300 and the driving chip 110.

The display panel 200 includes a first substrate 100 and a second substrate 150 opposite to the first substrate 100 to display an image. A plurality of pixels (not shown), a plurality of signal wires electrically connected with the pixels, and a plurality of input wires are on the first substrate 100. Signal wire 105 is described as an example and the description of the other signal wires is not provided, because the signal wires have the same structure. Similarly, input wire 108 is described as an example and the description of the other input wires is not provided, because the input wires have the same structure.

The display panel 200 may be a liquid crystal display panel or an organic light emitting display panel, in the embodiment shown in FIGS. 1 and 2. When the display panel 200 is a liquid crystal display panel, each pixel includes a pixel electrode (not shown) and a thin film transistor (not shown) which is electrically connected with the pixel electrode and switches a driving signal that is supplied to the pixel electrode. Further, when the display pane 200 is an organic light emitting display panel, each pixel may include an anode electrode (not shown), a thin film transistor (not shown) which switches a driving signal that is supplied to the anode electrode, an organic light emitting layer on the anode electrode, and a cathode electrode on the organic light emitting layer.

The driving chip 110 is electrically connected with the signal wire 105 and the input wire 108, on the first substrate 100. The driving chip 110 includes an input terminal (not shown) and an output terminal (not shown), the input terminal is electrically connected with the input wire 108 at the first bonding region A1, and the output terminal is electrically connected with the signal wire 105 at the second bonding region A2. As a result, the driving chip 110 can output a driving signal to the pixels through the signal wire 105, in response to an input signal from the signal transmitter 300 electrically connected with the input wire 108.

The signal transmitter 300 has a connector 355. The signal transmitter 300 can receive the input signal through an electronic device electrically connected with the connector 355, for example, a printed circuit board (not shown). The structure of the signal transmitter 300 is as follows. The signal transmitter 300 includes a base layer 310, a first conductive layer 320, a first insulating layer 330, a second conductive layer 340, and a second insulating layer 350.

The base layer 310 contains insulating substances, such as PI (Polyimide) or PET (Polyethylene terephthalate) while the conductive layer and the insulating layer are stacked on the base layer 310. The first conductive layer 320 is on one side of the base layer 310. The first conductive layer 320 may include metal having high electric conductivity, such as copper. Further, the first conductive layer 320 is electrically connected with the input wire 108 at the first bonding region A1 of the bonding portion 101.

Further, the second conductive layer 340 is on one side of the base layer 310, opposite the first conductive layer 320 with the base layer 310 therebetween. Though not shown in detail in FIG. 2, a via hole may be formed through the base film 310, such that the first conductive layer 320 and the second conductive layer 340 can be electrically connected to one anther by a conductive material in the via hole. Accordingly, the input signal that is inputted through the connector 355 can be transmitted to the first conductive layer 320, because the connector 355 is electrically connected with the second conductive layer 340.

The first insulating layer 330 protects the first conductive layer 320 from the outside by covering the first conductive layer 320. The second insulating layer 350 protects the second conductive layer 340 from the outside by covering the second conductive layer 340.

The area where the first conductive layer 320 overlaps the first substrate 100 is smaller than the area where the second conductive layer 340 overlaps the first substrate 100. In more detail, although the first conductive layer 320 overlaps the first bonding region A1, the second conductive layer extends in a first direction D1 further than the first conductive layer 320, such that the second conductive layer overlaps the first bonding region A1 and the second bonding region A2.

The combination of the first conductive layer 320 and the second conductive layer 340 is beneficial for resistance to electro magnetic interference. In general, first electro magnetic interference 160 may be generated while the input signal is transmitted from the first conductive layer 320 to the input wire 108, such that the display quality of the display apparatus 400 may be affected by the first electro magnetic interference 160. However, according to the embodiment of the present invention shown in FIGS. 1 and 2, since the second conductive layer 340 covers the first bonding region A1, the first electro magnetic interference 160 can be blocked by the second conductive layer 340, and accordingly, it is possible to prevent the display quality of the display apparatus 400 from being affected by the first electro magnetic interference 160.

Further, second electro magnetic interference 165 may be generated while the driving signal is outputted from the driving chip 110 to the signal wire 105. The second electro magnetic interference 165 may deteriorate the display quality of the display apparatus 400, similar to the first electro magnetic interference 160. However, according to the embodiment shown in FIGS. 1 and 2, since the second conductive layer 340 covers second bonding region A2 and the driving chip 110 as well as the first bonding region A1, the second electro magnetic interference 165 can be blocked by the second conductive layer 340, and accordingly, the display quality of the display apparatus 400 is not affected by the second electro magnetic interference 165.

Because the driving chip 110 generally has a high-density integrated circuit therein, when electro static discharge 168 is applied to the driving chip 110 from the outside, the integrated circuit of the driving chip 110 is damaged by the electro static discharge 168, such that malfunction may be caused in the driving chip 110. However, according to the embodiment shown in FIGS. 1 and 2, the second conductive layer 340 can block the electro static discharge 168 by covering the driving ship 110, such that the second conductive layer 340 can prevent the driving chip 110 from being damaged by the electro static discharge 168.

Figure 3:
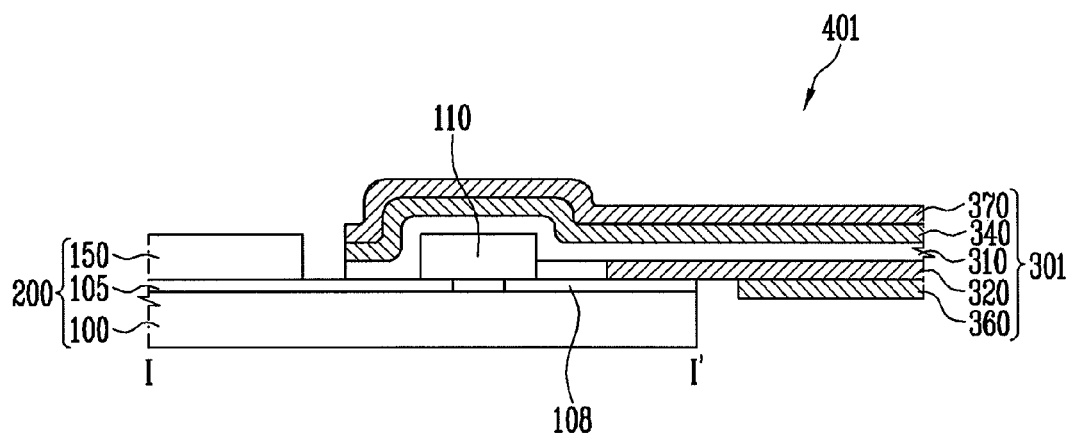
FIG. 3 is a cross-sectional view of a display apparatus according to another embodiment.

FIG. 3 is a cross-sectional view of a display apparatus according to another embodiment. The components described above with reference to FIGS. 1 and 2 are generally designated by the same reference numerals and a repeated description for the components is generally not provided, in describing FIG. 3.

Referring to FIG. 3, a display apparatus 401 includes a display panel 200, a signal transmitter 301, and a driving chip 110. The signal transmitter 301 includes a base layer 310, a first conductive layer 320, a second conductive layer 340, a first sub-conductive layer 360, and a second sub-conductive layer 370.

Further, the first sub-conductive layer 360 is on one side of the first conductive layer 320, opposite to the base layer 310 with the first conductive layer 320 therebetween. Further, the second sub-conductive layer 370 is on the second conductive layer 340, opposite to the base layer 310 with the second conductive layer 340 therebetween. In the embodiment according to the present invention shown in FIG. 3, the first sub-conductive layer 360 and the second sub-conductive layer 370 may each contain metal, such as silver.

As described above with reference to FIGS. 1 and 2, the second conductive layer 340 extends to the second bonding region A2, across the first bonding region A1, such that it overlaps the first bonding region A1 and the second bonding region A2.

Further, the second sub-conductive layer 370, similar to the second conductive layer 340, also extends to the second bonding region A2, across the first bonding region A1, such that it overlaps the first bonding region A1 and the second bonding region A2. Therefore, the second sub-conductive layer 370 prevents the display quality of the display apparatus 401 from being deteriorated by the first electro magnetic interference (160 in FIG. 2) and the second electro magnetic interference (165 in FIG. 2), together with the second conductive layer 340. Further, the second sub-conductive layer 370 can prevent the driving chip 110 from being damaged by the electro static discharge (168 in FIG. 2), together with the second conductive layer 340.

Figure 4:
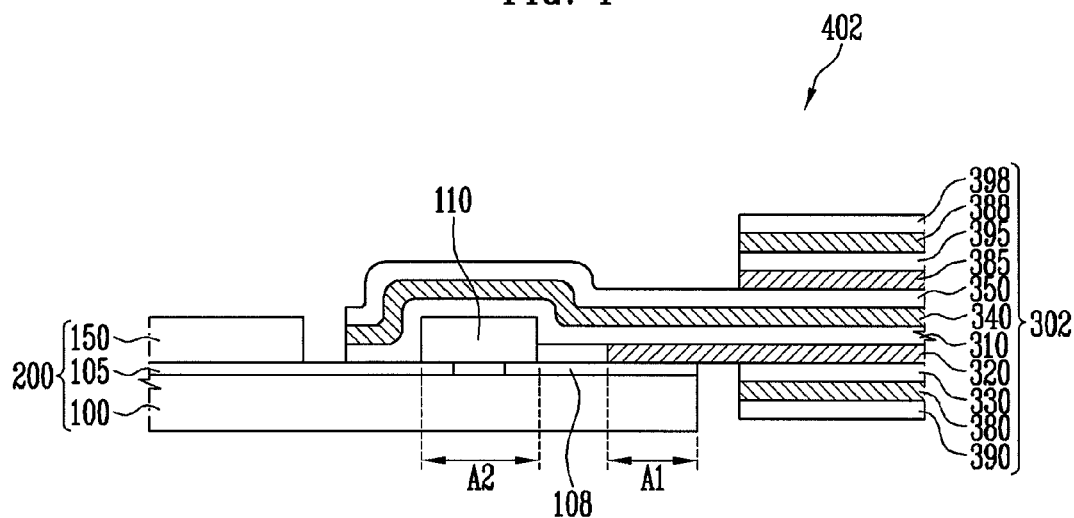
FIG. 4 is a cross-sectional view of a display apparatus according to another embodiment.

FIG. 4 is a cross-sectional view of a display apparatus according to another embodiment. The components described above with reference to FIGS. 1 and 2 are generally designated by the same reference numerals and a repeated description for the components is generally not provided, in describing FIG. 4. Referring to FIG. 4, a display apparatus 402 includes a display panel 200, a signal transmitter 302, and a driving chip 110.

The signal transmitter 302 includes a base layer 310, a first conductive layer 320, a second conductive layer 340, a third conductive layer 380, a fourth conductive layer 385, a fifth conductive layer 388, a first insulating layer 330, a second insulating layer 350, a third insulating layer 390, a fourth insulating layer 395, and a fifth insulating layer 398.

Comparing the structure of the signal transmitter 302 shown in FIG. 4 with the structure of the signal transmitters 300 and 301 shown in FIGS. 1 and 2, the signal transmitter 302 further includes, the third conductive layer 380, the fourth conductive layer 385, the fifth conductive layer 388, the third insulating layer 390, the fourth insulating layer 395, and the fifth insulating layer 398.

The third conductive layer 380 is on one side of the first insulating layer 330, opposite the first conductive layer 320 with the first insulating layer 330 therebetween while the fourth conductive layer 385 is on the second insulating layer 350, opposite the second conductive layer 340 with the second insulating layer 350 therebetween. Further, the fifth conductive layer 388 is on the fourth insulating layer 395, opposite the fourth conductive layer 385 with the fourth insulating layer 395 therebetween. Further, the third insulating layer 390 is the lowermost layer of the signal transmitter 302, protecting the third conductive layer 380 while the fifth insulating layer 398 is the uppermost layer of the signal transmitter 302, protecting the fifth conductive layer 388.

When the signal transmitter 302 has a structure in which conductive layers are stacked, with an insulating layer therebetween, in the upper layers or the lower layers from the base layer 310, the signal transmitter 302 can simultaneously transmit different input signals. For example, when fifth conductive layer 388 is exposed to the outside, with the fifth insulating layer 398 partially removed, the exposed fifth conductive layer 388 can transmit an input signal that is different from any of the first to fourth conductive layers 320, 340, 380, and 385.

The second conductive layer 340 covers or overlaps the first and second bonding layers A1 and A2 by further extending to the second bonding region A2 than the first conductive layer 320, across the first bonding region A1. Therefore, as described above with reference to FIGS. 1 and 2, the second conductive layer 340 can block the first electro magnetic interference (160 in FIG. 2), the second electro magnetic interference (165 in FIG. 2), and the electro static discharge (168 in FIG. 2).

Some embodiments block the first electro magnetic interference, the second electro magnetic interference, and the electro static discharge, together with the first conductive layer 320, by further having at least one of the fourth conductive layer 385 and the fifth conductive layer 388 extended to cover the first and second bonding regions A1 and A2, in addition to the second conductive layer 340.

Figure 5:
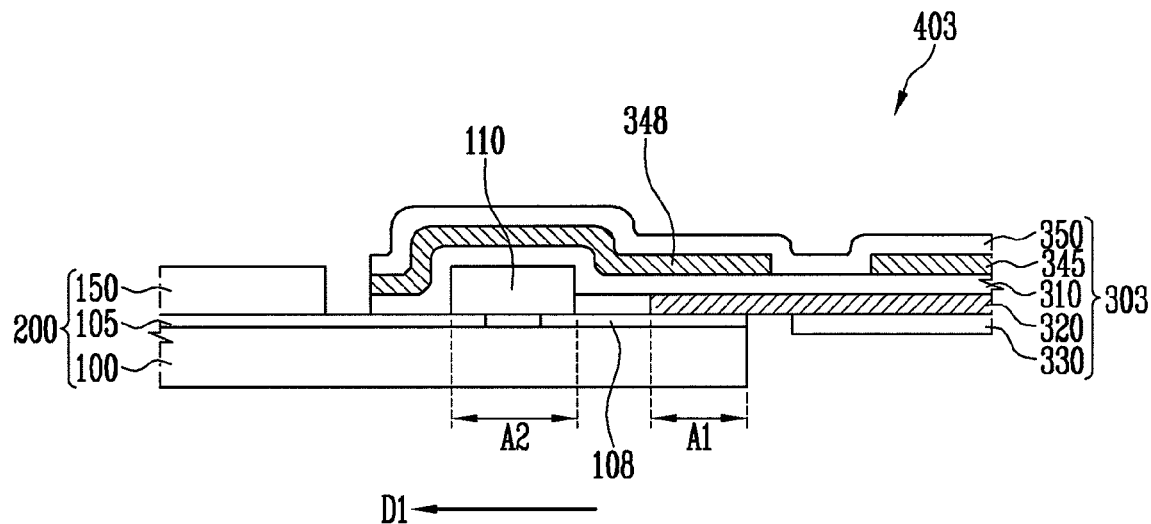
FIG. 5 is a cross-sectional view of a display apparatus according to another embodiment.

FIG. 5 is a cross-sectional view of a display apparatus according to another embodiment. The components described above with reference to FIGS. 1 and 2 are generally designated by the same reference numerals and a repeated description for the components is generally not provided, in describing FIG. 5.

Referring to FIG. 5, a display apparatus 403 includes a display panel 200, a signal transmitter 303, and a driving chip 110.

The signal transmitter 303 includes a base layer 310, a first conductive layer 320, a first insulating layer 330, a second conductive layer 345, a first shield layer 348, and a second insulating layer 350.

The second conductive layer 345 may be electrically connected with the first conductive layer 320 through the conductive material in a via hole formed through the base film 310. Accordingly, the input signal that is inputted through the connector 355 can be transmitted to the first conductive layer 320, because the connector 355 is electrically connected with the second conductive layer 345.

The shield layer 348 is on the base layer 310, together with the second conductive layer 345 and is insulated from the second conductive layer 345 by the second insulating layer 350. Further, the shield layer 348 can block the electro static discharge (168 in FIG. 2) and the first and second electro magnetic interference (160 and 165 in FIG. 2) because it overlaps the first bonding region A1 and the second bonding region A2.

Figure 6:
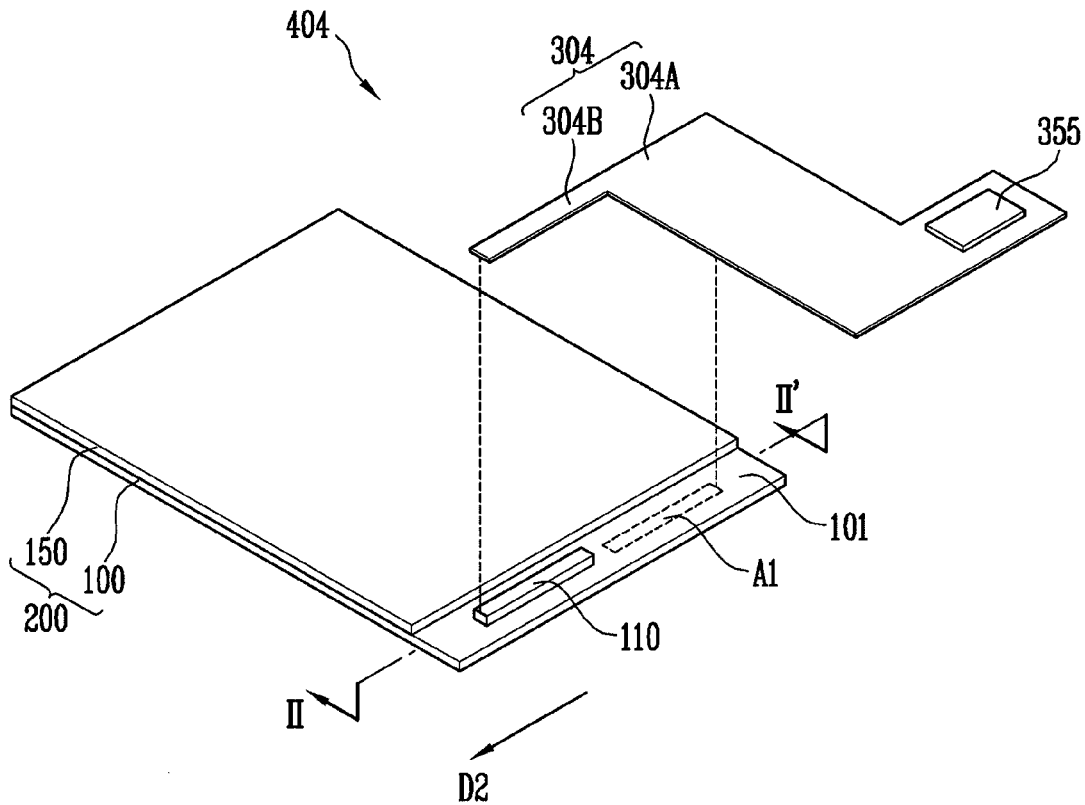
FIG. 6 is an exploded perspective view of a display apparatus according to another embodiment.
Figure 7:
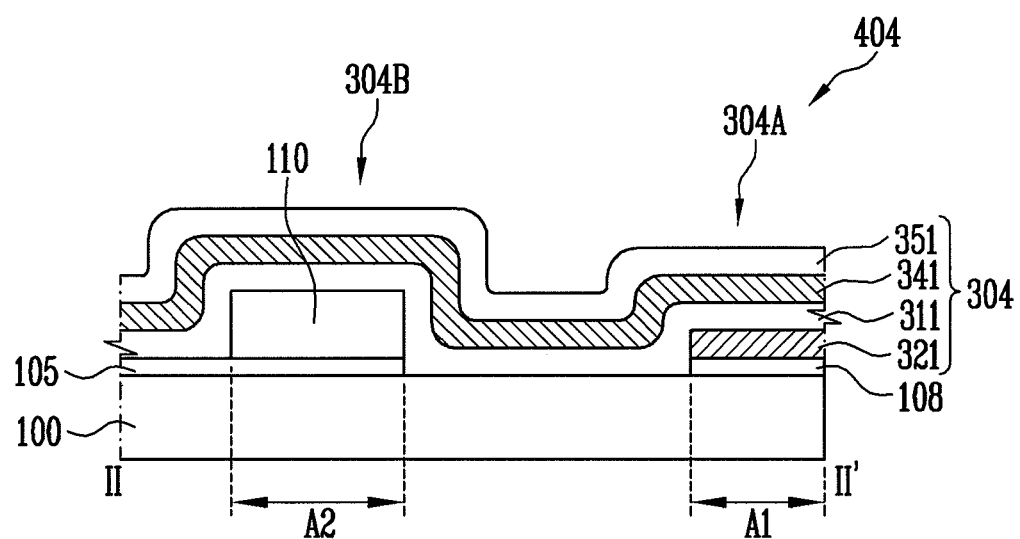
FIG. 7 is a cross-sectional view showing a portion cut off along the line II-II' of FIG. 6.

FIG. 6 is an exploded perspective view 404 according to another embodiment, and FIG. 7 is a cross-sectional view showing a portion cut off along the line II-II' of FIG. 6. The components described above with reference to FIGS. 1 and 2 are generally designated by the same reference numerals and repeated description for the components are generally not provided, in describing FIGS. 6 and 7.

Referring to FIGS. 6 and 7, a display apparatus 404 includes a display panel 200, a signal transmitter 304, and a driving chip 110. The signal transmitter 304 includes a body 304A and a shield portion 304b extending in a second direction D2 from the body 304A. The body 304A includes a base layer 311, a first conductive layer 321, a first insulating layer (not shown), a second conductive layer 341, and a second insulating layer 351, and the first conductive layer 321 is electrically connected with an input wire 108 at a first bonding region A1.

Further, the shielding portion 304B is formed by the first base layer 311, the second conductive layer 341, and the second insulating layer 351 which extend to the second region A2 across the first region A1. As shown, the second conductive layer 341 covers the driving chip 110. Therefore, the shield portion 304B can block the first and second electro magnetic interference (160 and 165 in FIG. 2) and the electro static discharge (168 in FIG. 2).

While various aspects and features have been described in connection with certain exemplary embodiments, it is to be understood that the invention is not limited to the disclosed embodiments, but, on the contrary, is intended to cover various modifications and equivalent arrangements.

What is claimed is:
1. A display apparatus comprising:
a display panel configured to display an image;
a signal transmitter electrically connected with the display panel at a first bonding region of the display panel and receives an input signal from a source external to the display apparatus; and
a driving chip that is electrically connected with the display panel at a second bonding region of the display panel and outputs a driving signal corresponding to the image to the display panel in response to the input signal,
wherein the signal transmitter includes:
a base layer;

a first conductive layer on the base layer, wherein the first conductive layer is electrically connected to the display panel, and
a second conductive layer that covers the first bonding region and the second bonding region, wherein the base layer is between the first and second conductive layers.

2. The display apparatus according to claim 1, wherein the second conductive layer overlaps the first conductive layer and the driving chip, and extends to the second bonding region across the first bonding region.

3. The display apparatus according to claim 2, further comprising:
a sub-conductive layer on the second conductive layer, wherein the sub-conductive layer overlaps the driving chip and the first conductive layer, and extends to the second bonding region across the first bonding region, and wherein the second conductive layer is between the base layer and the sub-conductive layer.

4. The display apparatus according to claim 2, wherein the signal transmitter further includes:
a third conductive layer insulated from the first conductive layer, wherein the first conductive layer is between the base layer and the third conductive layer;
a fourth conductive layer insulated from the second conductive layer, wherein the second conductive layer is between the base layer and the fourth conductive layer; and
a fifth conductive layer insulated from the fourth conductive layer, wherein the fourth conductive layer is between the base layer and the fifth conductive layer.

5. The display apparatus according to claim 2, further comprising:
a first insulating layer that covers the first conductive layer, wherein the first conductive is between the base layer and the first insulating layer; and
a second insulating layer that covers the second conductive layer, wherein the second conductive layer is between the base layer and the second insulating layer,
wherein the base layer and the second insulating layer extend to the second bonding region across the first bonding region.

6. The display apparatus according to claim 1, wherein the second conductive layer is divided into at least two parts, which are insulated and spaced apart from one other, and one of the two part covers the first bonding region and the second bonding region.

7. The display apparatus according to claim 1, wherein the display panel includes:
a first substrate having the first bonding region and the second bonding region; and
a second substrate connected to the first substrate, wherein the first substrate includes:
an input wire electrically connected with the first conductive layer in the first bonding region; and
a signal wire electrically connected with the driving chip in the second bonding region.

8. The display apparatus according to claim 7, wherein an area where the second conductive layer overlaps the first substrate is larger than an area where the first conductive layer overlaps the first substrate.

9. The display apparatus according to claim 1, wherein the display panel is a liquid crystal display panel.

10. The display apparatus according to claim 1, wherein the display panel is an organic light emitting display panel.

* * * * *

UNITED STATES PATENT AND TRADEMARK OFFICE
CERTIFICATE OF CORRECTION

PATENT NO. : 8,576,210 B2
APPLICATION NO. : 13/233902
DATED : November 5, 2013
INVENTOR(S) : Hyo-Sang Yang et al.

Page 1 of 1

It is certified that error appears in the above-identified patent and that said Letters Patent is hereby corrected as shown below:

IN THE SPECIFICATION

In column 3 at line 38, Change "anther" to --another--.

IN THE CLAIMS

In column 8 at line 2, In Claim 5, change "conductive is" to --conductive layer is--.

Signed and Sealed this
Tenth Day of March, 2015

Michelle K. Lee
*Deputy Director of the United States Patent and Trademark Office*